Dec. 22, 1936.  L. K. BEHR  2,065,041
SAW TOOTH
Filed March 6, 1936
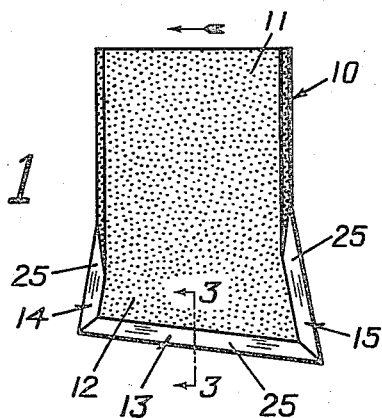
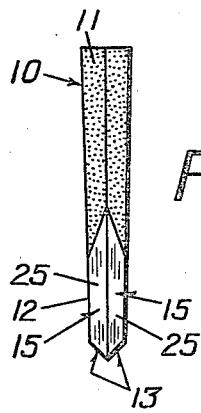
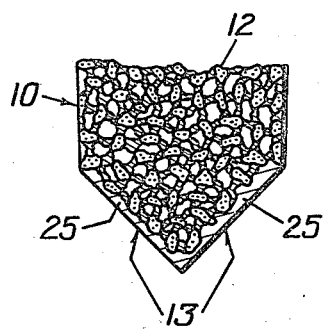
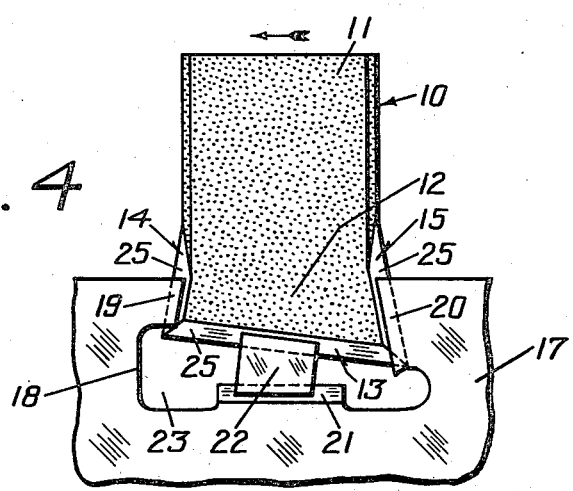
Inventor
LEROY K. BEHR
By George Gump
Attorney Patented Dec. 22, 1936

2,065,041

UNITED STATES PATENT OFFICE 2,065,041

SAW TOOTH

Leroy K. Behr, Worcester, Mass., assignor to Norton Company, Worcester, Mass., a corporation of Massachusetts Application March 6, 1936, Serial No. 67,516

6 Claims. (Cl. 125—22)

The invention relates to saw teeth, and with regard to its more specific features to an abrasive saw tooth adapted to be detachably mounted and secured in a saw plate of either the circular or reciprocable type for cutting stone and other hard material.

One object of the invention is to provide a saw tooth of the character indicated of long life. Another object of the invention is to provide an abrasive saw tooth which shall not abrade the socket in which it is held. Another object of the invention is to provide a coating for the root of an abrasive saw tooth which shall inhibit its abrading action upon the tooth receiving socket formed in the butt of the saw. Another object of the invention is to provide a facile method for manufacturing an abrasive saw tooth having the characteristics indicated. Another object of the invention is to provide a method for improving the qualities of abrasive saw teeth in order to avoid wearing of the sockets in which they are held. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein and the scope of the application of which will be indicated in the following clams.

In the accompanying drawing in which is shown one of many possible embodiments of the mechanical features of this invention, Fig. 1 is a side elevation of an abrasive tooth;

Fig. 2 is a front elevation of the abrasive tooth;

Fig. 3 is an enlarged cross sectional view taken on the line 3—3 of Fig. 1;

Fig. 4 is a fragmentary view of a saw and tooth receiving socket showing an abrasive tooth held therein.

I provide a quantity of abrasive grain. Within the limits of this invention any type of abrasive may be used, for example aluminium oxide in all its forms, or silicon carbide, diamonds, garnet, silica or any other desired abrasive material. I further provide any suitable bonding material. While various type of bonds might be used carrying out my invention, I prefer to use one of the organic bonds, for example rubber, shellac or an artificial resinoid. In the preferred form of the invention I use a bond comprising a phenolformaldehyde resin, or a glycerine phthalic anhydride resin commonly known under the name of "Glyptol".

Any desired grain size may be employed and the percentage of abrasive grain to bond may vary in accordance with any usual or desired practice in the abrasive industries. I provide a mold which is shaped to form a saw tooth 10 illustrated in Figs. 1 and 2. I fill the mold with the mixture of abrasive grains and bonds, which is rendered plastic, and press the same to form a shape such as illustrated. Then, in accordance with known methods, the pressed shape is baked in an oven or otherwise heat treated to form the indurated article of homogeneous structure and consistency and adequate strength. Heat treating, whether indurating or vulcanizing, may be carried on in accordance with the known practice in the abrasive arts; if the bond is rubber the proper proportion of sulphur will be added to promote vulcanization to a hard rubber of the nature of ebonite.

The saw tooth 10 comprises an abrasive portion 11 which merges with a root portion 12. Referring to Figs. 1, 2 and 3, the root portion 12 has a bevel or V-bottom 13, a bevel or V-front portion 14 and a bevel or V-back portion 15; the bottom, front and back together with a dividing line separating the root 12 from the abrasive portion 11 forming a trapezoid. The trapezoidal root 12 is mounted in a saw 17, usually made of steel, in a socket 18 thereof, which socket has a front V-shaped groove 19 and a back V-shaped groove 20 the apexes of whose dihedral angles are inclined to each other by the same angle as the angle between the front 14 and back 15 of the trapezoid. The socket 18 further provides a convex V-portion 21 opposite the bottom 13. A wedge 22 has V-grooves in its opposite sides fitting the convex V-portion 21 and the convex V-bottom 13 respectively.

In order to mount the tooth 10 in the saw 17, which may be a circular saw or a band saw, the trapezoidal portion is first passed by the opposite V-groove portions 19 and 20 until it will enter the socket 18, then the tooth 10 is placed in the plane of the saw 17 and moved radially or outwardly until the front 14 and the back 15 enter into wedging engagement with the V-grooves 19 and 20. The wedge 22 may now be inserted from the large open space 23 at one end of the socket, and the wedge may be driven home with a lead hammer or in any other manner. The saw moves in the direction of the arrows, Figs. 1 and 4, and consequently on starting up the inertia of the wedges 22 tends to force them into wedging engagement so as to lock the parts together. Nevertheless a saw tooth can be readily removed from the saw.

In driving the wedge 22 home, in moving the saw tooth 10 outwardly against the pressure of the retaining grooves 19 and 20, and in otherwise assembling, disassembling, or adjusting this saw tooth, the steel portions of the saw plate 17 including the socket 18 and the wedge 22 are subject to wear on account of the abrasive nature of the saw tooth. While various expedients have been proposed to overcome this difficulty I prefer to form an integral homogeneous saw tooth as described and to coat the portions 13, 14 and 15 with a substantial coating of a wear resisting material which shall avoid or prevent abrasion of the metal parts and also increase the life of the abrasive tooth. I have described that because of the quasi porous nature of the abrasive tooth I can use a substance in the nature of a cement which shall practically integrally unite with the saw tooth or the root thereof at the portions named or otherwise. For the protective substances forming a coating 25 which as illustrated in Fig. 3 embeds itself into the substance of the root I prefer a copper oxide cement, for example a freshly made mixture of calcined cupric oxide and phosphoric acid, which is a cement of the oxyphosphate type. This may be applied as with a knife blade or a small trowel just after it is made and it quickly hardens forming a smooth and durable coating which rigidly attaches itself to the abrasive body.

One advantage in the construction described, involving the protection of the root by means of a coating, lies in the fact that an accurate fit between the root 12 and the socket 18 (which may be deemed to include the wedge 22) may be achieved. Various expedients have been proposed for avoiding the abrasion of the saw socket but the present invention is characterized by simplicity of manufacture, rigidity of structure and the avoidance of detrimental effects such as lessening a production of noise incident to some prior methods of protecting the root.

At the same time the copper oxide cement forms an extremely hard coating yet one which is smooth and lacks abradant qualities.

Other suitable hard cements might be employed for example magnesium oxychloride, litharge, zinc oxide phosphoric acid cement, or other hard cold setting cements.

Another feature of copper oxide and similar cements is that they form a surface having sufficient friction to grip the socket portions including the wedge and to form a tight interlocking engagement therewith. There is sufficient resiliency to the copper oxide cement to make a tight wedging engagement and at the same time it is hard enough so that cutting of the coating by the wedge when it is driven into place is avoided. Furthermore the copper oxide and the other hard cements protect the abrasive grains preventing them from digging into the wedges and into the other portions of the socket. The cements named are not affected by water during a grinding operation.

It will thus be seen that there has been provided by this invention a method and an apparatus in which the various objects hereinbefore set forth are successfully achieved. As many possible embodiments may be made of the mechanical features of this invention, and as the art herein described may be varied in various parts, all without departing from the scope of the invention, it is to be understood that all matter hereinbefore set forth or shown in the accompanying drawing is to be interpreted as illustrative and not in a limiting sense.

I claim:

1. An abrasive saw tooth comprising an abrasive section, a root, and a coating of an oxyphosphate cement on the root.

2. An abrasive saw tooth comprising an abrasive section, a root, and a copper oxide cement on the root.

3. An abrasive saw tooth comprising an abrasive section, a root having beveled edges, and a cupric oxide phosphoric acid cement on said beveled edges.

4. The method of making an abrasive saw tooth comprising an abrasive section and a root which comprises plastering the portion of the root which is to come in contact with the holder with a hard cold setting cement.

5. An abrasive tooth comprising an abrasive section and a root, the root where it comes in contact with the socket of the saw holder being covered with an integrally united layer of a cold setting hard cement.

6. The method of protecting the root portion of an abrasive tooth particularly at the beveled V-edges thereof which comprises plastering the same with a cold setting cement forming a hard surface of the group consisting of copper oxide, litharge, magnesium oxychloride, and zinc oxide phosphoric acid.

LEROY K. BEHR.